United States Patent Office 3,444,571
Patented May 20, 1969

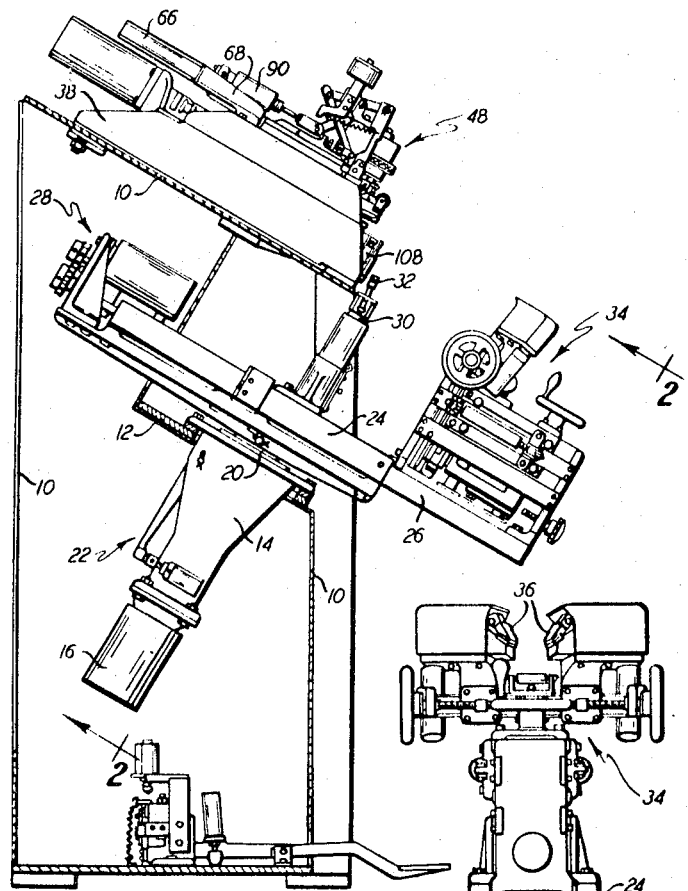
FIG.-1
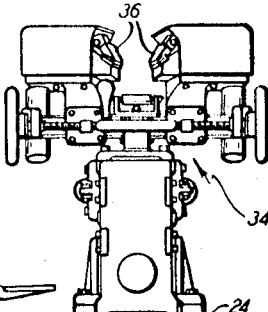
FIG.-2
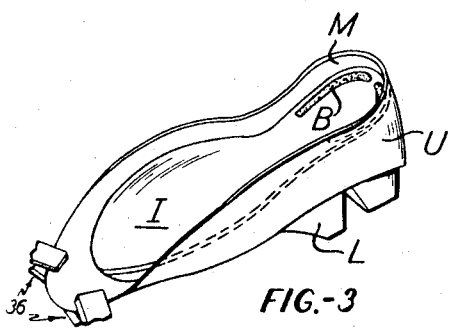
FIG.-3
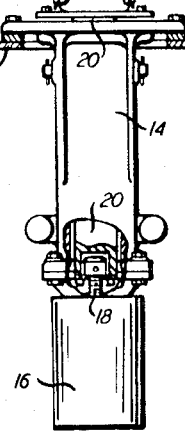
INVENTORS
Allen C. Harriman
Robert F. Donahue
ATT'Y

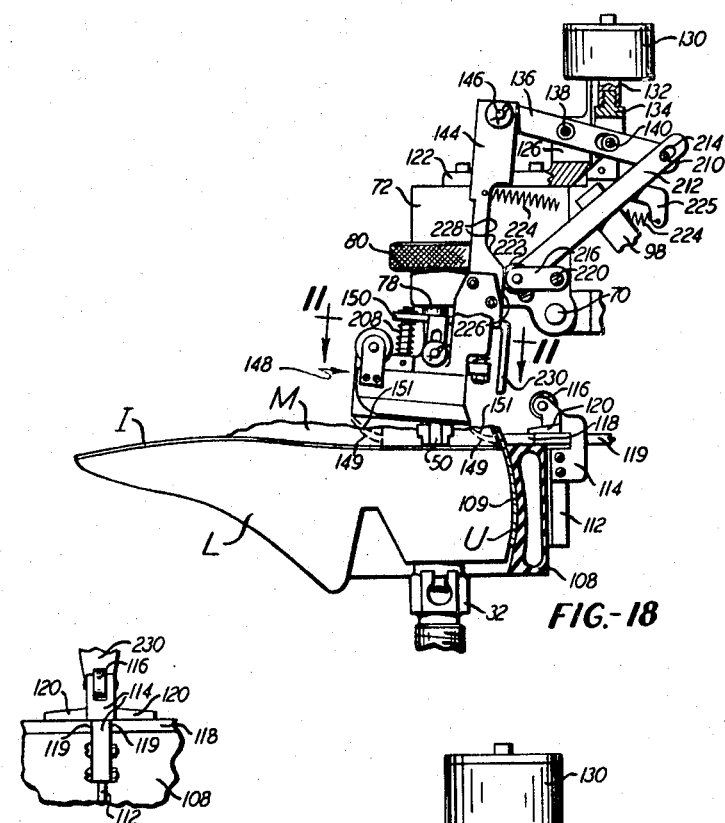
FIG.-18
FIG.-17
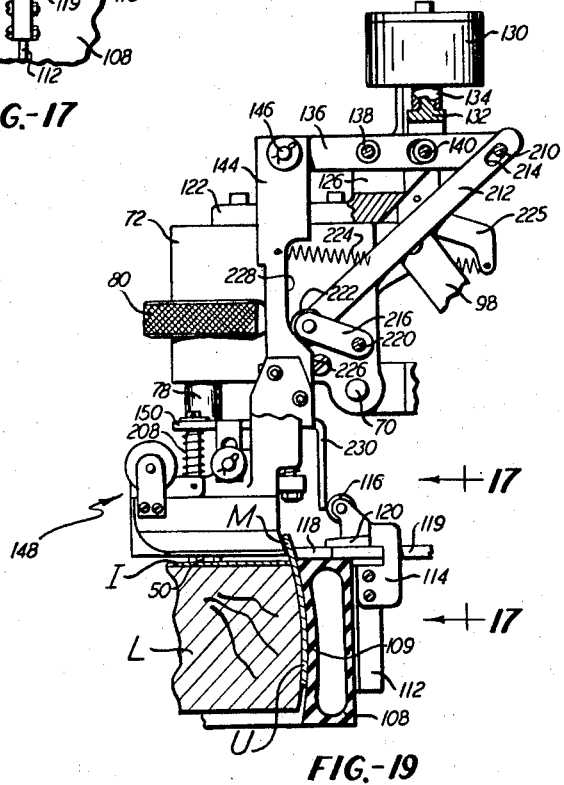
FIG.-19

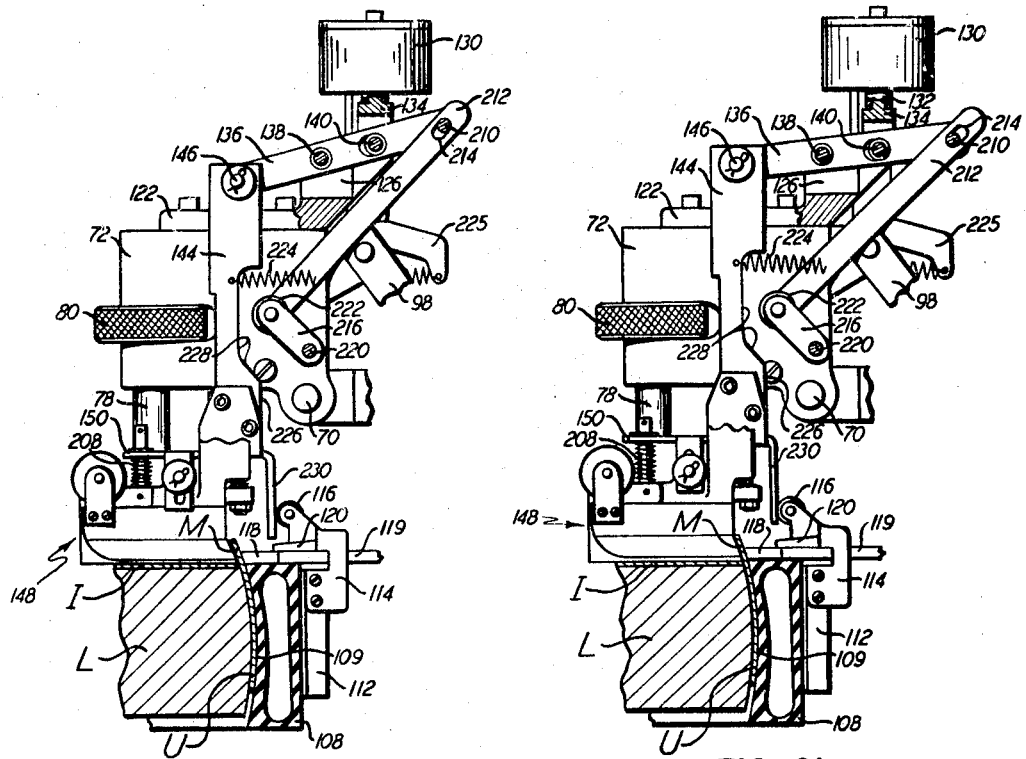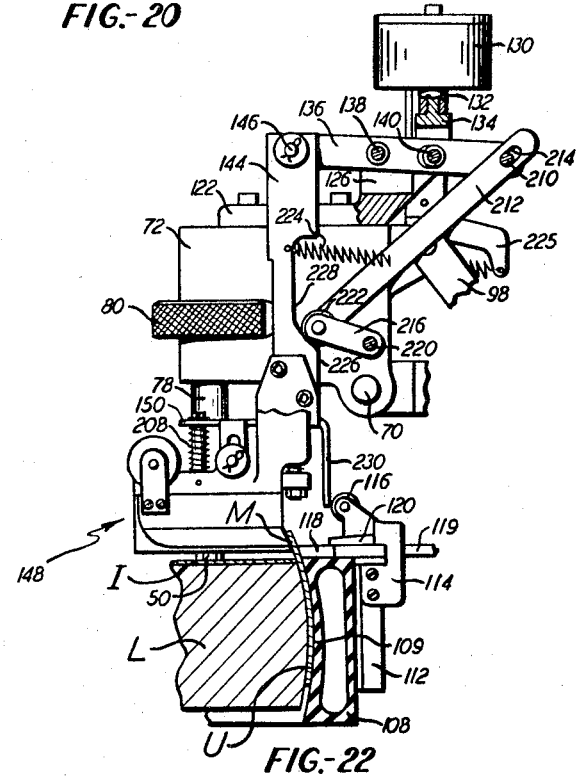
FIG.-20  FIG.-21  FIG.-22

3,444,571
APPARATUS FOR APPLYING ADHESIVE
TO A SHOE ASSEMBLY
Allen C. Harriman, Brockton, and Robert F. Donahue, Waltham, Mass., assignors to Jacob S. Kamborian, West Newton, Mass.
Filed July 1, 1966, Ser. No. 562,136
Int. Cl. A43d 21/00, 23/00
U.S. Cl. 12—12.5          25 Claims

ABSTRACT OF THE DISCLOSURE

A shoe lasting machine having a shoe support, adhesive applicator, wipers, a shoe end clamping member, and a stop member mounted for movement with the end clamping member to properly locate the adhesive applicator with respect to the bottom of a shoe. The support engages guide mechanism which causes the support and adhesive applicator to follow a predetermined path of movement.

---

This invention relates to improvements in the lasting of shoes and more particularly to an apparatus for depositing an adhesive on shoe parts that are to subsequently be bonded to each other. The illustrative embodiment of the invention is shown as being used with the heel seat lasting machine disclosed in pending United States application Ser. No. 478,185 filed Aug. 9, 1965 in which a shoe assembly including a last having an insole located at its bottom and a shoe upper draped thereabout is supported therein in a bottom-up position and in such a manner that a marginal portion of the shoe upper extends upwardly beyond the level of the insole to form an angulate portion between the upper margin and the insole. The instant invention is also an improvement over the subject matter disclosed in Patent No. 3,392,704. The particular embodiment of the instant invention has an adhesive applicator which is adjustable to fit into the angulate portion of the shoe assembly, irrespective of the size of the shoe assembly whereupon adhesive may be forced from the source thereof through the applicator and onto the angulate portion of the shoe assembly in a pattern determined by the particular construction of the adhesive applicator.

The adhesive applicator is mounted to the machine in a manner similar to that of the aforementioned United States Patent No. 3,392,704 and includes support members mounted to the machine above the shoe assembly for movement which is towards and away from the shoe assembly. The adhesive applicator is suspended from the lower ends of the support members for limited universal movement with respect thereto so that as the support members are moved downwardly towards the shoe assembly to thus bring the adhesive applicator to bear against the bottom of the shoe assembly the adhesive applicator may adjust itself to the insole of the shoe assembly to become seated in flush abutment therewith.

One aspect of the invention resides in an improved guide mechanism which engages the support members and causes them and the adhesive applicator supported therefrom to follow a predetermined path of movement when being moved towards and away from the angulate portion of the shoe assembly.

A further aspect of the invention is concerned with a device for properly locating the adhesive applicator with respect to the bottom of the shoe assembly irrespective of the size or shape of the shoe assembly. A further aspect of the invention is concerned with an adhesive applicator that is adjustable so as to be capable of use with shoes of varying shapes and sizes.

Figure 4:
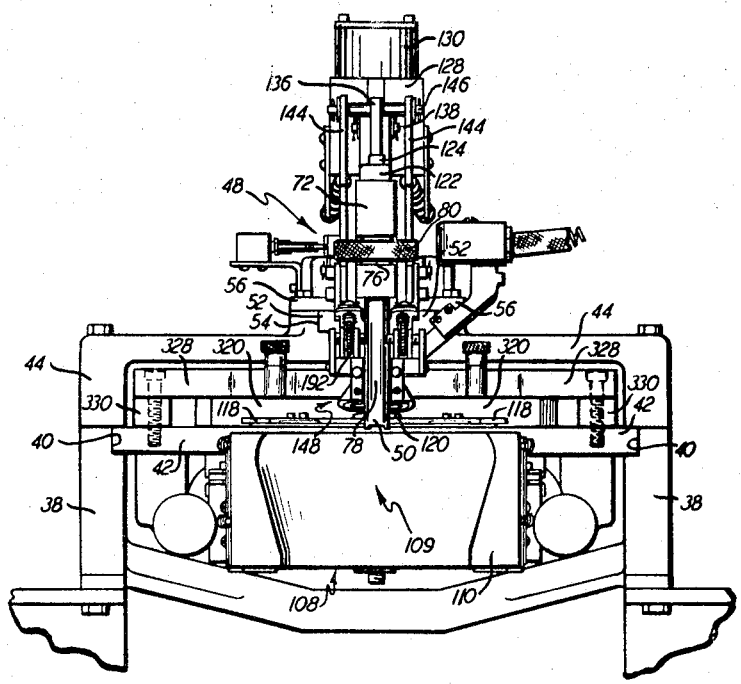
Figure 5:
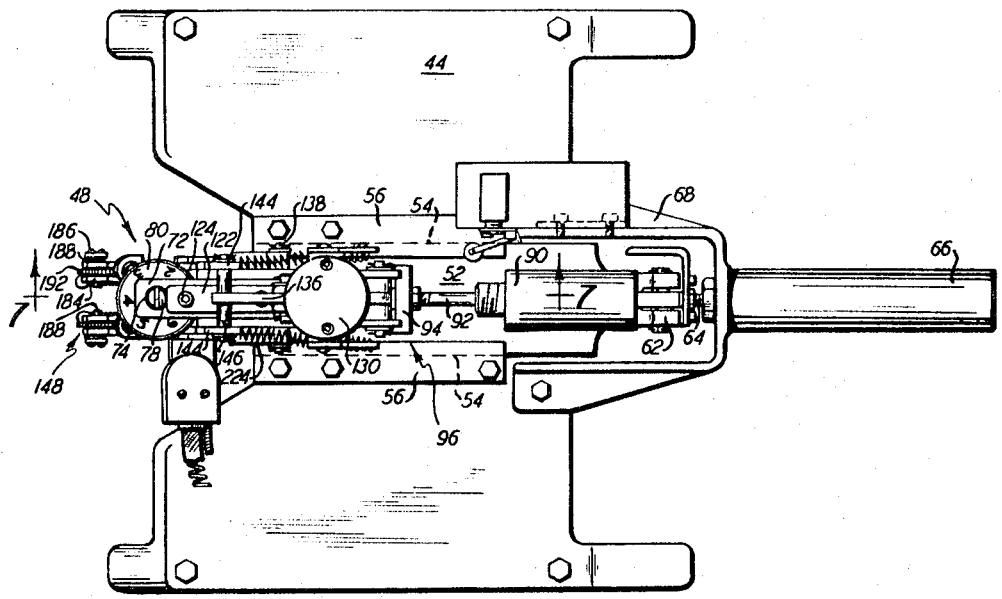
Figure 6:
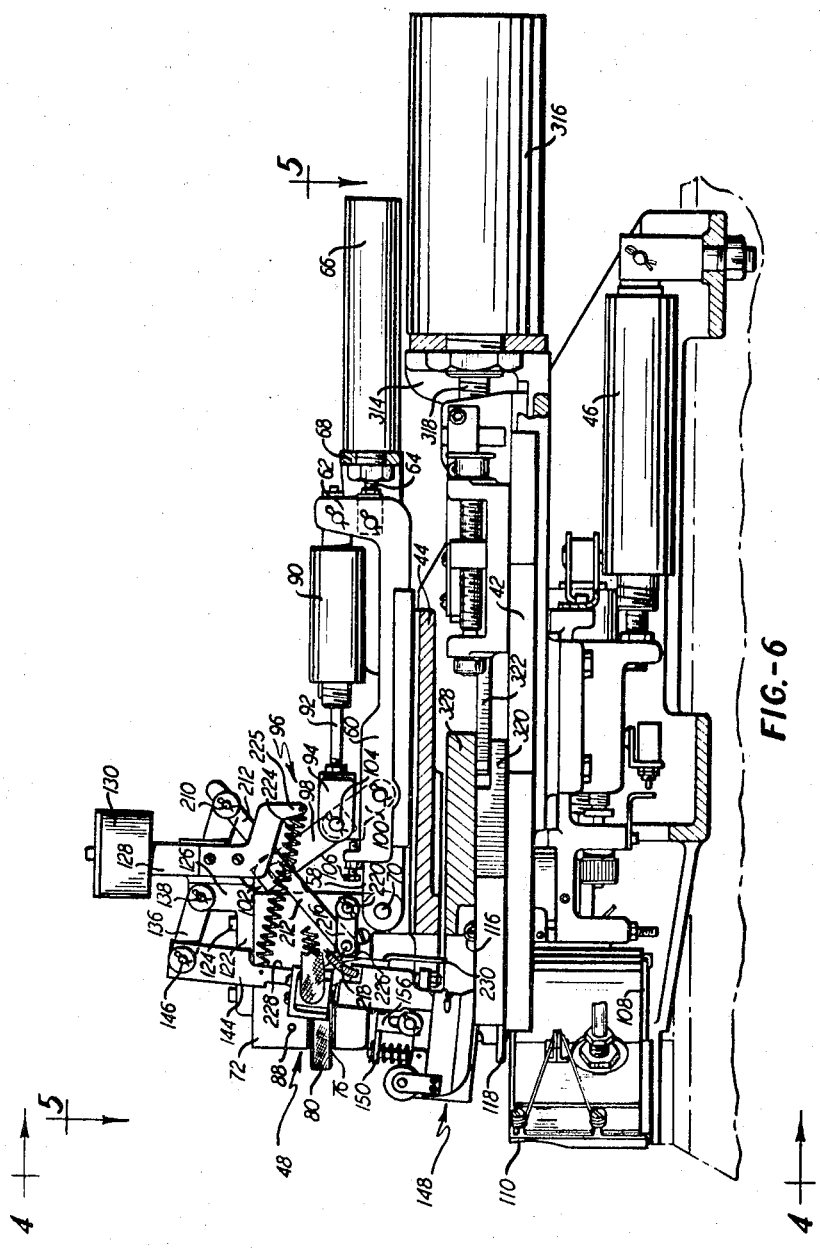
Figure 7:
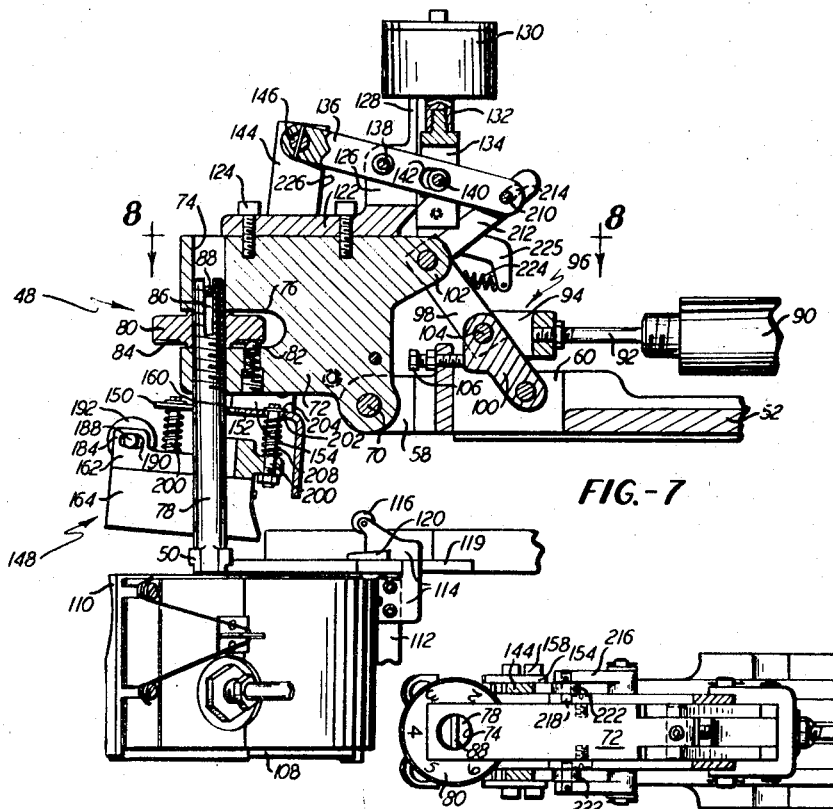
Figure 8:
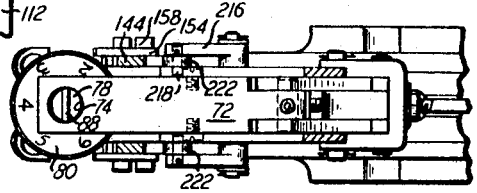
Figure 9:
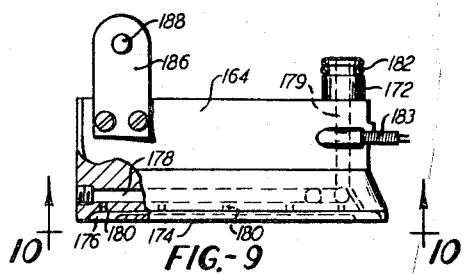
Figure 10:
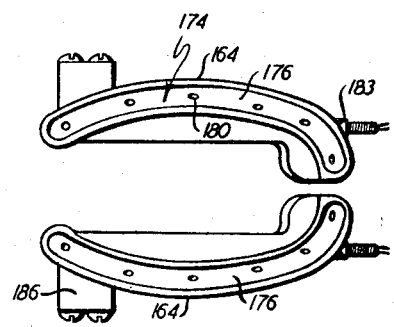
Figure 11:
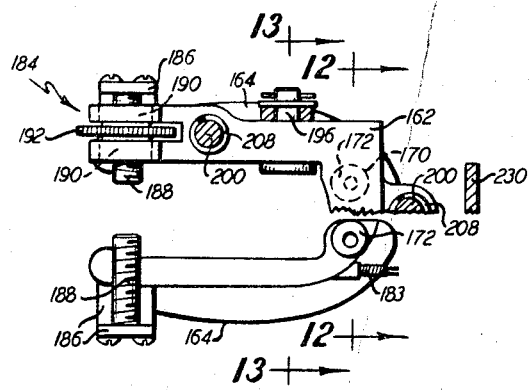
Figure 12:
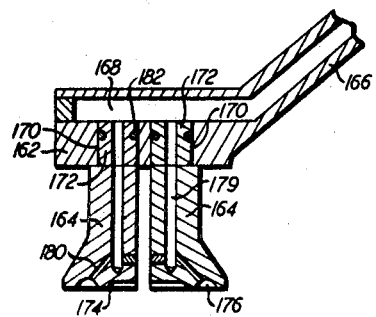
Figure 14:
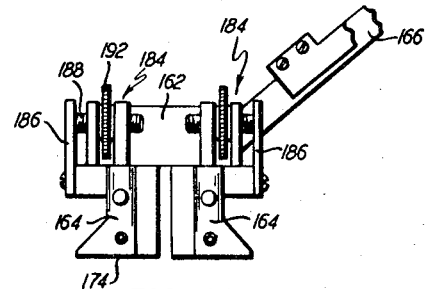
Figure 13:
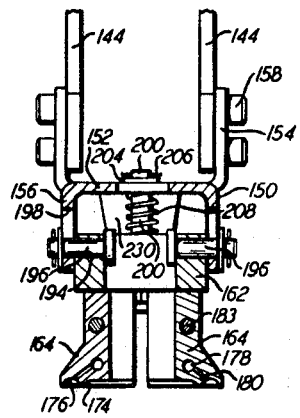
Figure 15:
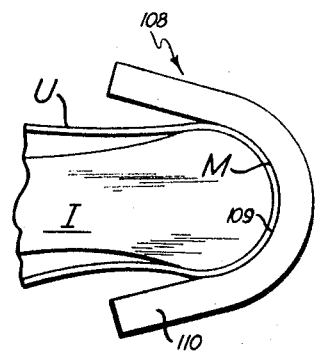
Figure 16:
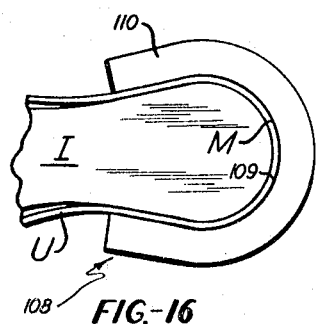
Figure 23:
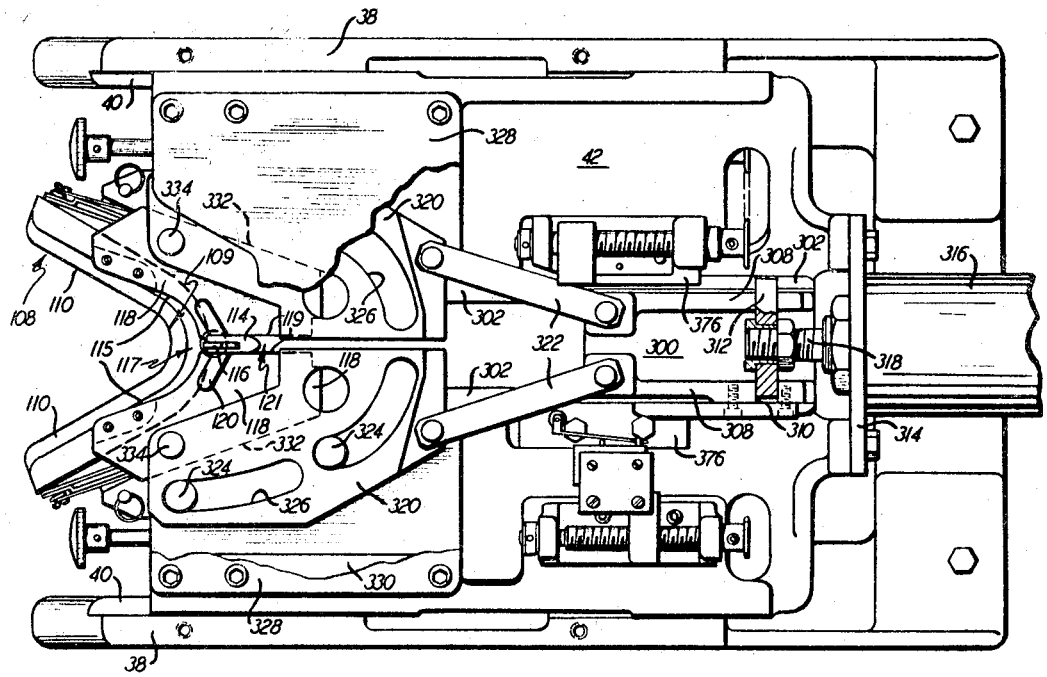

The invention will be described in greater detail with reference to the accompanying drawings wherein:
FIGURE 1 is a side elevation of the machine;
FIGURE 2 is a front view of the machine taken on the line 2—2 of FIGURE 1;
FIGURE 3 is a view of the shoe assembly after the bead of adhesive has been deposited on the insole but before the wiping operation has occurred;
FIGURE 4 is a front view of the head and the mechanisms mounted thereto, taken along the line 4—4 of FIGURE 6;
FIGURE 5 is a top view of the head illustrating the hold-down adhesive applicating mechanisms in plan, taken along the line 5—5 of FIGURE 6;
FIGURE 6 is a side elevation, partly in section, of the heel clamping, hold-down, wiping and adhesive applicating mechanisms;
FIGURE 7 is a side elevation, partly in section, of the hold-down and adhesive extruding mechanisms, with the section portions thereof being taken along the line 7—7 of FIGURE 5;
FIGURE 8 is a sectional view of the hold-down and adhesive extruding mechanism taken along the line 8—8 of FIGURE 7;
FIGURE 9 is a side elevation, partly broken away, of one of the applicator members;
FIGURE 10 is a view of the bottom surface of the applicator members as viewed from the line 10—10 of FIGURE 9;
FIGURE 11 is a top view of the adhesive applicator as seen from the line 11—11 of FIGURE 18, with a portion of the support member removed;
FIGURE 12 is a sectional view of the adhesive applicator taken along the line 12—12 of FIGURE 11 and illustrating the manner in which the applicator members are mounted to the support member;
FIGURE 13 is a sectional view of the adhesive applicator taken along the line 13—13 of FIGURE 11;
FIGURE 14 is a front elevation of the adhesive applicator;
FIGURE 15 is a somewhat diagrammatical plan view of the heel clamp pad when the bight thereof contacts the heel end of the shoe assembly;
FIGURE 16 is a somewhat diagrammatical plan view of the heel clamp pad after the legs thereof have been pressed inwardly towards the shoe assembly;
FIGURE 17 is a rear view of the heel clamp pad and roller supported thereon, with the striking plate in engagement with the roller, as viewed from the line 17—17 of FIGURE 19;
FIGURE 18 is a side elevation of the adhesive applicator and guide mechanism thereof when in an idle, out-of-the-way position, and illustrating the lost motion connection between the lever and the first driving link;
FIGURE 19 is a side elevation of the adhesive applicator and guide mechanism therefor and illustrating the disposition of the various members when the striking plate engages the roller mounted to the heel clamp pad;
FIGURE 20 is a side elevation of the adhesive applicator and guide mechanism therefor and illustrating the disposition of the various members thereof when the adhesive applicator is in working engagement with the shoe assembly;
FIGURE 21 is a side elevation of the adhesive applicator and guide mechanism therefor and illustrating this position of the various members just after the mechanism is activated to cause the adhesive applicator to be retracted to its idle, out-of-the-way position;
FIGURE 22 is a side elevation of the adhesive applicator and guide mechanism therefor at that time in the retraction of the adhesive applicator to its out-of-the-way position when the cam roller engages the cam track on the support member; and FIGURE 23 is a plan view of the wipers and the wiper drive mechanism.

The machine in which the instant invention is incorporated has a frame 10 to which is mounted a base 12. The base 12 and the various components mounted thereto are inclined at an angle of about 30 degrees to the horizontal to facilitate accessibility of the machine to the operator. Depending from the base 12 is a housing 14. For ease of explanation, the direction of the base 12 will be referred to as horizontal and the direction of the housing 14 will be referred to as vertical. In operating the machine the operator stands to the right of the machine and directions that are towards the operator will be described as forward while directions that are away from the operator will be described as rearward.

As disclosed in the aforementioned pending application Ser. No. 478,185 filed Aug. 9, 1965, an air operated motor 16 is secured to the lower end of the housing 14 and has a piston rod 18 extending upwardly into the interior of the housing 14. The upper end of the piston rod 18 is connected to the lower end of a post 20 the post 20 being mounted in the housing 14 in such a manner as to permit both vertical axial and rotary motion about its longitudinal axis. The upper end of the post 20 protrudes beyond the upper end of the housing 14. The connection between the piston rod 18 and the post 20 is such that the post 20 may be rotated about its longitudinal axis without any interference between them. Brake means 22 (partially shown in FIGURE 1 and more fully disclosed in application Ser. No. 353,462 filed Mar. 20, 1964) is operatively associated with the post 20 to prevent further rotational movement of the post 20 once its desired angular position has been effected.

Secured to the upwardly protruding end of the post 20 is an elongated platform 24 which is movable in unison with the post 20 and is so constructed as to accommodate an elongated base 26 for forward and rearward movement therein so that the base 26 may have motion which is both independent of and unitary with the platform 24. A drive mechanism 28 is mounted to the rear of the platform 24 and is operatively connected to the elongated base 26 to effect the movement of the base 26 with respect to the platform 24.

A shoe assembly which includes a last L having an insole I located at the bottom thereof and a shoe upper U draped thereabout is supported on devices described below which are in turn carried by the platform 24. The shoe assembly is supported by these devices at its heel end and at its toe end while being oriented in a bottom-up and toe forward position.

A pedestal 30 having a last pin 32 projecting upwardly therefrom is secured to the platform 24 and is effective to support the heel end of the shoe assembly in a manner fully disclosed in the aforementioned application Ser. No. 478,185. Mounted forwardly of the pedestal 20 and to the forward end of the movable elongate base 26 is a toe supporting and shoe upper stretching mechanism 34 which is operative to initially grip the margin M of the shoe upper U at its toe end by means of pincers 36 and to subsequently pull the toe end of the upper horizontally forward and then vertically upward to tightly stretch the upper U about the heel end of the last L thereby insuring that the finished shoe will conform in shape to that of the last L.

When the machine has performed this function the shoe assembly assumes the position shown in FIGURE 3 with the heel end of the upper U tight about the last L and the upper margin M extending upwardly above the level of the insole I.

Secured to the top of the frame 10 above and rearwardly of the pedestal 30 and the upper stretching mechanism 34 is a head 38 about which are located mechanisms which hold the last L down firmly on the pedestal 30 to maintain the last L in a rigid condition during subsequent operations, clamp the heel of the upper U to the last L to thereby press the heel portion of the upper U to the last L thus insuring that the finished shoe will conform in shape to that of the last, extrude adhesive onto the heel end of the insole I in a predetermined pattern and wipe the margin M of the upper against that portion of the insole I that has been coated with adhesive. Inasmuch as it is the adhesive extruding mechanism that is the subject of the instant invention the other mechanisms will be described only to the extent necessary to properly illustrate its environment and use, reference again being made to the aforesaid application Ser. No. 478,185 for a complete disclosure of the structure and operation of these environmental devices.

Referring to FIGURE 4 guideways 40 are formed in the head 38 for slidable accommodation of a main slide plate 42. A head cover 44 is bolted to the head 38 and is spaced above the main slide plate 42. The guideways 40 are of such construction as to restrict the main slide plate 42 to motion in a horizontal plane between a rearward out-of-the-way position and a forward, working position. A fluid operated motor 46 (see FIGURE 6) is operatively associated with the main slide plate 42 to effect the aforesaid motion thereof. The aforementioned mechanisms for wiping the upper U against the insole I and clamping the upper against the heel end of the last L are mounted to the main slide plate 42 for a movement therewith, the primary function of the main slide plate 42 being to carry these mechanisms mounted thereto from a rearward out-of-the-way position to a forward, working position.

To insure that the shoe assembly is rigidly supported during performance of the vertically upward stretching of the upper U and subsequent operations a hold-down mechanism 48 is provided and is mounted to the head cover 44. The hold-down mechanism 48 has a hold-down foot 50 which when in a working position is located above and in substantial alignment with the pedestal 30 upon which the heel portion of the shoe assembly is supported. With the shoe assembly mounted in the machine, the toe portion of the shoe upper U is gripped by the pincers 36 and is stretched horizontally in a forward direction. Immediately thereafter the motor 16 is activated to raise the post 20 and shoe supporting mechanism carried thereon so that the heel portion of the insole I is forced upwardly against the bottom of the hold-down foot 50 thereby rigidly clamping the last L and insole I between the pedestal 30 and the hold-down foot 50. Once so rigidly clamped the subsequent operations of stretching the upper vertically, clamping the heel end of the upper U to the heel end of the last L etc. may be performed with assurance that the shoe assembly will remain stationary.

The hold-down mechanism 48 is so constructed that it may be horizontally withdrawn to a rearward out-of-the-way position so as not to interfere with the initial positioning of the shoe assembly in the machine. For a purpose later described the hold-down foot 50 may be raised, thereby terminating its function of maintaining the shoe assembly in a rigid position. Referring to FIGURES 4, 5 and 7 the hold-down mechanism 48 includes a hold-down slide 52 which is mounted for forward and rearward sliding motion in guideways 54 formed at the top of the head cover 44, the hold-down slide being retained in the guideways 54 by means of gibs 56. Formed integrally with the hold-down slide 52 are a front clevis 58, a middle clevis 60 and a rear clevis 62 (see FIGURES 6 and 7). The rear clevis 62 is pinned to the piston rod 64 of an air motor 66. The air motor 66 is rigidly secured to a bracket 68 which in turn is mounted to and extends rearwardly of the head cover 44. Thus, activation of the motor 66 will cause the piston rod 64 to impart forward or rearward motion to the hold-down slide 52 and all the components carried thereon. Swingably mounted to the front clevis 58, by means of a pin 70, for motion in a vertical plane is a hold-down block 72 having a vertical bore 74 formed through its most forward end. A horizontal slot 76 is also formed in the hold-down block 72 and intersects the vertical bore 74. A rod 78 having its upper portion threaded and the hold-down foot 50 located at its lower end is slidably contained within the vertical bore 74, the threaded portion of the rod 78 being in engagement with a knurled nut 80 which occupies the horizontal slot 76. Thus, the extent that the rod 78 and the hold-down foot 50 protrude downwardly from the hold-down block 72 may be varied by rotation of the nut 80. A ball 82 is spring biased upwardly against the underside of the nut 80 so as to act as a detent and radial grooves 84 are formed at the underside of the nut 80 to engage the ball 82 thereby maintaining the nut 80 and consequently the rod 78 in the position desired. In order to preclude rotation of the rod 78 while the nut 80 is rotated, the upper end of the rod 78 has a vertical slot 86 formed therein. The vertical slot 86 is engageable with a pin 88 secured to the hold-down block 72 and traversing the vertical bore 74 of the hold-down block 72. The hold-down mechanism 48 is so constructed that when the motor 66 is activated to move the hold-down slide 52 to its forward, working position the hold-down foot 50 will be located above the pedestal 30.

An air actuated motor 90 is pivotally mounted to the rear clevis 62 and has a forwardly extending piston rod 92 to the forward end of which is mounted a clevis 94. The clevis 94 is part of a toggle linkage 96 which functions to cause the hold-down block 72 to pivot rearwardly about the pin 70 thereby raising the hold-down foot 50. The toggle linkage 96 has a pair of upper links 98 and a lower link 100 the upper links 98 being pivotally connected at one end to a rearwardly extending lug 102 which is an integral part of the hold-down block 72 and pivotally connected at the other end to the clevis 94 by means of a pin 104. The lower link 100 is pivotally connected at one end to the middle clevis 60 on the hold-down slide 52 and pivotally connected at its other end to the clevis 94 and the upper links 98 by means of the pin 104. It may thus be seen that operation of the motor 90 to cause the piston rod 92 to move rearwardly will impart a rearward (clockwise as seen in FIGURES 6 and 7) rotary motion to the hold-down block 72 thereby raising the hold-down foot 50. For the purpose of limiting and adjusting the extent that the hold-down block 72 may rotate forwardly, a stop bolt 106 is threaded into the front of the hold-down slide 52 whereby rotation of the lower link 100 in a counterclockwise direction (see FIGURES 6 and 7) may terminate when the lower link 100 abuts the stop bolt 106. When the motor 66 is activated to move the hold-down slide 52 to a forward working position the motor 90 is operative to maintain the piston rod 92 thereof in a forward position so that the hold-down foot 50 is in its lower position when brought into vertical alignment with the pedestal 30.

When the shoe assembly is rigidly supported between the pedestal 30 and the hold-down foot 50 the shoe upper U having been stretched tightly about the heel end of the last in both forward and upward directions the air motor 46 is activated to cause the main slide plate 42 together with the mechanisms carried thereon to be moved to a forward working position. Referring to FIGURES 1, 4, 6 and 7 a heel clamp pad 108 (which is actuable by a drive mechanism not shown herein but fully disclosed in the aforementioned application Ser. No. 478,185 filed Aug. 9, 1965) is suspended from the main slide plate 42 and extends forwardly thereof. The heel clamp pad 108 is of a substantially U-shaped configuration and is adapted to embrace the heel end of the shoe assembly. It is suspended from the main slide plate 42 in such a manner that when the post 20 has been raised to cause the shoe assembly to be rigidly clamped between the pedestal 30 and the hold-down foot 50 it will be at the same elevation as that of the shoe assembly so that when the main slide plate 42 is moved forwardly under the influence of the motor 46 the heel clamp pad 108 may move forwardly therewith until the bight 109 of the heel clamp pad comes into abutment with the heel end of the shoe assembly (see FIGURE 15), the legs 110 of the heel clamp pad embracing the sides of the shoe assembly. Upon abutment of the bight 109 of the heel clamp pad 108 with the heel end of the shoe assembly the drive mechanism for the heel clamp pad 108 is actuated to cause the legs 110 to swing inwardly towards sides of the shoe assembly to thereby press the heel end of the shoe upper U tightly against the last L (see FIGURE 16).

As illustrated in FIGURE 7 and more fully disclosed in the aforementioned application Ser. No. 478,185 filed Aug. 9, 1965 a portion of the means for supporting the heel clamp pad 108 includes a lug 112 that is mounted to the rear of the heel clamp pad near the bight 109 thereof. Mounted to and extending upwardly of the lug 112 is a bracket 114 having a roller 116 rotatably mounted to the upper portion thereof for a purpose later described in detail.

Referring to FIGURES 4, 6, 17, 18 and 23 a pair of wipers 118 are movably mounted atop the main slide plate 42 which are operative by means of a drive mechanism therefor to fold and wipe the upwardly extending margin M of the shoe upper U against the heel end of the insole I. The wipers 118 are essentially flat plates and are restricted to motion in a horizontal plane. The drive mechanism for the wipers 118 is operative to cause the wipers 118 to move over the heel end of the shoe assembly with a compound motion that is fully described in the aforementioned application Ser. No. 478,185, it being sufficient to note here that the forward, working edges 115 of the wipers 118 are caused to swing inwardly towards each other about a vertex 117. The horizontal plane of motion of the wipers is at an elevation between that of the upper boundaries of the heel clamp pad 118 and the roller 116 there being a cut-out 119 formed at the adjacent rearward edges of the wipers to permit the bracket 114 to extend upwardly therethrough, the cut-out 119 of each of the wipers 118 defining a slot 121 (see FIGURE 23). The bracket 114 is provided with a pair of laterally extending retaining wings 120 (see also FIGURE 17) that lie above the level of the wipers 118, the wings 120 being effective to preclude downward movement of the bracket 114 and roller 116 when and if the stresses imposed on the heel clamp pad 108 are such as to tend to move the heel clamp pad 108 downwardly thus insuring that the roller 116 will be maintained at substantially the same level at all times. It should be noted that upward movement of the heel clamp pad 108 and the roller 116 therewith in response to similar stresses imposed on the heel clamp pad 108 is precluded by means of the proximity of the upper surface of the heel clamp pad with the bottom surface of the wipers 118. The wiper drive mechanism includes a wiper slide 300 that is slidably mounted for forward and rearward movement in guideway 302 formed in the upper surface of the main slide plate 42. The wiper slide 300 is retained in the guideways by gibs 304 and 306. The wiper slide 300 has a pair of upwardly extending longitudinal walls 308, each wall having a vertical slot 310 formed therein. A connecting bar 312 rests laterally within the slots 310. The rear of the main slide plate 42 is formed into a bracket 314 to which is mounted an air actuated motor 316 having a forwardly extending piston rod 318, the piston rod 318 being connected to the connecting bar 312 so that activation of the motor 316 will cause the wiper slide 300 to move forwardly or rearwardly in the guideways 302. Slidably mounted to the upper surface of the forward end of the main slide plate 42 are a pair of wiper cams 320 to which are mounted the wipers 118. A pair of links 322 pivotally connect the wiper slide 300 and the wiper cams 320 so that motion may be transmitted to the wiper cams 320 and consequently, to the wipers 118 upon actuation of the wiper slide 300 by the motor. For the purpose of guiding the wiper cams 320 in a desirable predetermined path, rollers 324 are rotatably mounted to the main slide plate 42 and protrude upwardly into cam slots 326 formed in the wiper cams 320 for accommodation of the rollers 324. It may thus be seen that the path of motion of the wiper cams 320 and the wipers 118 will be governed by the shape of the cam slots 326. The wiper cams 320 are maintained in sliding contact with the main slide plate 42 by means of a cover 328 which is bolted to the main slide plate 42 and is spaced therefrom by means of spacers 330, the spacing between the main slide plate 42 and the cover 328 being such that the wiper cams 320 may have horizontal sliding motion only, there being insufficient clearance for allowance of any substantial vertical movement (see also FIGURE 4).

The wipers 118 are mounted to the wiper cams 320 by means of horizontal slots 332 which are formed in the forward edges of the wiper cams 320 for accommodation of the wipers 118. Once inserted into the slots 332, the wipers 118 are retained therein by means of pins 334 which are inserted through each wiper cam 320 and each wiper 118, there being aligned holes formed in the wiper cams 320 and in the wipers 118 for this purpose.

Referring to FIGURE 23 it may be seen that when the wipers 118 are in an open, idle condition the bracket 114 extends upwardly through the slot 121. Upon actuation of the motor 316 to cause the wipers 118 to swing inwardly about the vertex 117 the rearward adjacent edges of the wipers 118 become separated. The wings 120 of the bracket 114 extend laterally an amount sufficient to insure that at least a portion thereof may remain in contact with the upper surface of the wipers 118 as the rearward adjacent edges of the wipers 118 become separated and swing away from the bracket 114 during the wiping stroke.

In order for the wipers 118 to effectively wipe the upper margin M to the insole I the shoe assembly must be at a height with respect to the bottom surface of the wipers 118 such that the bottom of the insole I is below the level of the bottom surface of the wipers 118 an amount equal to the thickness of the upper margin M. There is no provision in the machine for heightwise adjustment of the wipers 118. Thus, it may be seen that proper heightwise adjustment of the shoe assembly with respect to the wipers 118 must be effected by raising or lowering the elevation of the hold-down foot 50 by means of the knurled nut 80 to thereby vary the height to which the shoe assembly may be raised in response to actuation of the motor 16.

The improved adhesive extruding device which is the subject of the instant invention is incorporated into the machine and functions to coat that portion of the insole I to which the upper margin M will be subsequently wiped with a bead B of adhesive such that when the upper margin M thereafter is wiped against the insole I the two may become permanently bonded to each other (see FIGURE 3). It should be noted however that the device may be modified to deposit the bead B of adhesive on the upper margin M or on any other portion of the shoe assembly which is within the angle defined by the insole I and the upper margin M without departing from the spirit of the invention. As in the aforementioned Patent No. 3,392,704 the adhesive extruding device 120 is movably mounted to the hold-down mechanism 48 so that it may have motion which is both unitary with and independent of the hold-down mechanism 48 in the manner described below.

Referring to FIGURES 4, 5, 6 and 7 it may be seen that a bracket 122 is secured to the top of the hold-down block 72 by means of bolts 124. The rearward end of the bracket 122 is formed into a clevis 126 having a pair of upwardly extending legs 128. Secured to and straddling the upper ends of the legs 128 is an air actuated motor 130 having a piston rod 132 extending downwardly therefrom between the legs 128 of the clevis 126. Another clevis 134 having downwardly extending legs is secured to the piston rod 132 of the motor 130. A lever 136 is pivoted at a point intermediate its ends to the clevis 126 forwardly of the legs 128 by means of a pin 138 and has a rearwardly extending end that is pivotally connected to the clevis 134 by means of a pin 140 and slot 142 formed in the rearwardly extending end of the lever 136. It may thus be seen that activation of the motor 130 may serve to rotate the lever 136 in a clockwise direction (as seen in FIGURES 6 and 7) to thereby raise the forwardly extending end thereof and in a counterclockwise direction to thereby lower the forwardly extending end of the lever 136. A pair of parallel support members 144 are pivotally connected to the forwardly extending end of the lever 136 by means of a pin 146 in such a manner that they depend from the pin 146 and straddle the sides of the hold-down block 72. An adhesive applicator 148 is suspended from the lowermost end of the support members 144 in a manner described below. Activation of the motor 130 thus causes a raising or lowering of the support members 144 and the adhesive applicator.

Referring to FIGURES 6, 7 and 13 a bracket 150 having a base 152 is provided which has at the lateral extremities of the base 152 a pair of upwardly extending arms 154 and a pair of downwardly depending legs 156, the upwardly extending arms 154 being secured to the lower ends of the support members 144 by means of bolts 158. Inasmuch as the base 152 connects and spans the gap between the lower ends of the support members 144 and is located in the region occupied by the rod 78 a cut-out 160 is formed in the base 152 to accommodate the rod 78 so as to prevent mechanical interference therebetween. The bracket 150 serves to support the cement applicator 148 and rigidifies the support members 144 with respect to each other.

Referring to FIGURES 9, 10, 11, 12, 13 and 14, the cement applicator 148 is essentially an assembly composed of a rigid U-shaped upper support plate 162 and a pair of lower applicator plates 164. Formed as an integral part of the upper support plate 162 is a hollow extension 166 thereof which is adapted to provide communication between a source of cement under pressure and a void 168 formed within the upper support plate 162. A pair of laterally spaced holes 170 are formed at the rearward portion and at the bottom surface of the upper support plate 162, the holes 170 being in communication with the void 168 so as to permit adhesive to flow freely therethrough. Each of the lower applicator plates 164 has a hollow ferrule 172 secured thereto at the upper surface and rearward end thereof. The ferrules 172 are adapted to be received within the laterally spaced holes 170 formed in the upper support plate 162 and permit each of the lower applicator plates 164 to be pivoted towards and away from each other in a substantially horizontal plane thus permitting the forwardly extending portions of the lower applicator plates to be properly laterally spaced with respect to the particular shoe assembly that is being operated on. The bottom surface 174 of each of the lower applicator plates 164 is adapted to bear against the insole bottom and has a lower downwardly opening trough 176 formed thereat which is of a shape substantially paralleling the peripheral contour of the heel end of the insole I. Each of the lower applicator plates 164 has a bore 178 formed therein and extending substantially lengthwise thereof. Each of the bores 178 is in communication with the hollow portion of its associated ferrule 172 by means of the conduits 179. A plurality of conduits 180 are formed in each of the lower applicator plates 164 so as to communicate each of the bores 178 with its associated trough 176 thereby providing a continuous communication from the void 168 of the upper support plate 162 through the bore 178, through the conduits 179 and 180 and into the trough 176 of the lower applicator plate 164. A conventional O ring 182 may be provided between the ferrule 172 and its associated hole 170 formed in the upper support plate 162 to preclude leakage of the adhesive therefrom. Heaters 183 may be provided in the applicator member 164 to aid in maintaining thermoplastic adhesive material in a fluid condition.

Referring to FIGURES 11 and 14 it may be seen that a pair of laterally spaced clevises 184 are formed integrally with and extend upwardly of the forward end of the upper support plate 162. Secured to the forwardly extending end of each of the lower applicator plates 164 is an upwardly extending lug 186, the lugs 186 being positioned outwardly of the clevises 184 as to embrace the clevises 184 therebetween. A bolt 188 is secured at one end thereof to each of the lugs 186, each of said bolts 188 extending laterally inwardly into through the legs of its associated said clevis 184 by means of aligned holes 190 formed in the legs of said clevises 184. A nut 192 is contained between the legs of each of said clevises 184 and is in threaded engagement with that portion of the bolt 188 that is contained between the legs of its associated clevis 184. It may thus be seen that rotation of the nut 192 may serve to pivot its associated lower applicator plate about its ferrule 172 in a direction that is towards or away from the other of the lower applicator plates 162 depending on which way the nut 192 is rotated.

Referring to FIGURE 13 the upper support plate 162 is provided with a pair of laterally aligned holes 194 which accommodate pins 196 that protrude laterally therethrough into vertical slots 198 formed in the depending legs 156 of the bracket 150 so that the upper support plate 162 may be contained between and suspended from the depending legs 156. The slots 198 are so formed as to permit a lost motion connection in a vertical direction between the bracket 150 and the upper support plate 162. The pins 196 are so oriented as to have their longitudinal axis laterally aligned in a horizontal plane thus precluding rotary motion of the upper support plate 162 in a horizontal plane yet permitting vertical motion and a forward-rearward rotary tilting motion about the axis of the pins 196. The depending legs of the bracket 150 are spaced a distance corresponding to the lateral width of the upper support plate 162 so that a minimum of clearance between the legs 156 and the upper support plate 162 is provided thus precluding lateral tilting of the cement applicator 148.

The support plate 162 is resiliently urged downwardly for a purpose later described so that when in an idle condition the pins 196 are at the bottom of the slots 198. As may be seen from FIGURES 6, 7 and 13, secured to and extending upwardly from the support plate 162 are three columns 200. The uppermost ends of the columns 200 protrude through holes 202 formed in the base 152 of the bracket 150 which are of greater size than the columns 200 so that the aforementioned tilting movements of the upper support plate 162 may not be retarded.

Washers 204 loosely encircle the upwardly protruding ends of the columns 200 and pins 206 are secured to the columns 200 to limit the downward travel of the columns 200 thereby precluding the engagements of the columns 200 with the bracket 150. A coil spring 208 circumscribes each of the columns 200 and is interposed between the upper surface of the support plate 162 and the lower surface of the base 152 of the bracket 150 thereby biasing the support plate 162 in its lowermost position.

The cement extruding mechanism is provided with further refinements described below which are operable to effect a guiding of the cement applicator 148 from the out-of-the-way position illustrated in FIGURES 6 and 18 to the working position illustrated in FIGURE 20 in response to actuation of the air motor 130. Referring to FIGURES 6, 7, 18, 19, 20, 21 and 22 a pin 210 is secured to the rearward extremity of the lever 136 and extends laterally on both sides thereof. A first drive link 212 is located on each side of the hold-down block 72 and is disposed so as to extend in a forwardly and downwardly inclined direction. The upper and rearward end of the first link 212 has a slot 214 formed therein for lost motion accommodation of one end of the laterally extending pin 210. The forward and lower end of the first link 212 is connected to one end of a second driven link 216 by means of a pin 218, the other end of the second link 216 being pivotally connected to the hold-down block 72 by means of the pin 220. When in an out-of-the-way, non-working position the second link 216 extends in a substantially forward-rearward direction. The connected ends of the first and second links 212 and 216 are laterally spaced and a roller 222 is rotatably mounted to the pin 218 between the first and second links 212 and 216. Each roller 222 is so spaced on its pin 220 as to be located in substantially the same vertical plane as that of its associated support member 144 with which it is associated so that the support members may be rotated about the pin 220 into abutment with the rollers 222.

As shown in FIGURES 5 and 6 a tension spring 224 is located on each side of the hold-down block 72, each spring 224 being secured at its ends to and stretched between one of the support members 144 and a rearwardly protruding extension 225 of the clevis 122 so that the support members 144 may be continually urged rearwardly (counter-clockwise as seen in FIGURE 6) about the pin 146 thus causing the rearward edge 226 of each of the support members to bear against its associated roller 222.

The rearward edge 226 of each of the support members 144 has a portion thereof formed into a cam track 228 so that as the motor 130 is activated to move the support members downwardly with the spring 224 continually urging the support members 144 rearwardly against the rollers 222 the cooperation between the cam tracks 228 of the support members 144 and the rollers 222 may cause the support members to move in a rearward direction so that the resulting path of motion of the support members and consequently the adhesive applicator 146 is compounded from the aforementioned downward and rearward motions. The contour of the cam tracks 228 may be varied to provide different resulting paths of motion should this be desired.

Referring now to FIGURES 6, 7 and 8 it may be seen that the bracket 150 has a downwardly extending striking plate 230 depending from the rearward portion thereof.

The striking plate 230 is adapted to abut the roller 116 to terminate rearward movement of the support members 144 and adhesive applicator 148 mounted thereto, yet permitting continued downward movement of the support members 144 and cement applicator 148 towards and into engagement with the bottom of the insole I.

Referring now to FIGURES 18 and 20 it may be seen that the path of motion of the cement applicator 148 in the illustrative embodiment of the invention is between a forward and upward out-of-the-way position (see FIGURE 18) and a rearward, downward working position (see FIGURE 20) wherein the cement applicator is in engagement with the bottom of the shoe assembly. The construction of the cam tracks 212 and their associated rollers 222 is such as to cause the support members 144 and the cement applicator mounted thereto to move in a path such that the striking plate 230 of the bracket 150 is brought into abutment with the roller 116 prior to engagement of the cement applicator 148 with the bottom of the insole I (as illustrated in FIGURE 19) thus insuring that as the cement applicator is brought into engagement with the insole it will have movement in a purely downward direction thus preventing scraping of the insole I by the cement applicator 148. The particular advantage in terminating the rearward movement of the cement applicator 148 with reference to a point (i.e. the roller) that is fixed in relation to the bight 109 of the heel clamp pad 108 resides in the fact that when the bight 109 of the heel clamp pad 108 has been brought into engagement with the heel end of the shoe assembly, the roller 116 will be located the same distance from the heel end of the shoe assembly irrespective of the size or shape of the shoe assembly. Thus, when the striking plate 230 of the bracket 150 is moved rearwardly into engagement with the roller 116 the cement applicator 148 supported therefrom will at all times be located a fixed distance from the heel of the shoe assembly irrespective of the size or shape of the shoe.

When the shoe assembly has been presented to the machine and has been manipulated therein it may occasionally happen that the shoe assembly including the insole is tilted rearwardly or forwardly so that as the adhesive applicator is brought to bear against the insole by the aforementioned mechanism the bottom surface 174 thereof may not be in flush and complete abutment with the insole bottom. The aforementioned mounting of the adhesive applicator 148 for limited universal movement is effective, in such case, to permit the adhesive applicator to seat itself in flush abutment on the bottom of the insole in response to continued downward urging of the support members 144 by the motor 130. When the adhesive applicator has seated itself properly, the springs 208 are effective to maintain the adhesive applicator 148 in this position.

The control circuit of the machine is such that when the adhesive applicator 148 is in flush abutment with the insole bottom, adhesive is forced from a source thereof (not shown) into the extension 166 of the upper support plate 162, into the void 168 thereof, through the ferrules 172 of the lower support plates 164, into the bores 178, through the conduits 180 and into the troughs 176 which by means of the abutting cooperation between the bottom surface 174 of each of the lower applicator plates 164 and the insole bottom has become enclosed therebetween so that when adhesive is introduced into the trough 176 it may fill the trough 176 and simultaneously adhere to the insole in a pattern determined by the configuration of the trough 176. The adhesive applicator 148 having thus performed its function is then withdrawn to its nonworking position shown in FIGURE 18, leaving the deposited pattern of adhesive on the insole bottom (see FIGURE 3).

The particular construction of the herein disclosed invention is such that as the motor 130 is actuated to pivot the lever 136 in a counterclockwise direction to bring the cement applicator 148 downwardly towards the bottom of the insole I, the second link 216 is caused to pivot rearwardly and away from its associated support member 144 (clockwise, as seen in FIGURES 6, 18, 19 and 20). It should be noted that due to the lost-motion connection between the lever 136 and the first link 212, the second link 216 and roller 220 mounted thereto will remain motionless until the pin 220 engages the upper end of the slot 214. This causes each roller 220 to cooperate with the straight rearward surface 226 of its associated support member 144 to guide the adhesive applicator 148 in a downward direction having no rearward component of movement, the advantage in this being that the adhesive applicator 148 is maintained in a forwardly spaced relation to the upper margin M until the bottom surface 174 of the applicator has been carried below the level of the upper edge of the upper margin M thereby precluding the bottom surface 174 of the applicator 148 from engaging the upper edge of the upper margin M and crushing it. When the pin 210 engages the upper end of the slot 214 the aforesaid pivotal movement of the second link 216 and roller 222 begins. The path of movement of the adhesive applicator 148 during its downward motion is illustrated in FIGURE 18 by the dotted lines 149. The effect of this pivotal movement of the second link 216 is to cause the roller 222 to have a compound upward and rearward movement at the same time as the support members 144 are moving downwardly and rearwardly with the result that the rearward movement of the support members 144 is accelerated. The effect of this rearwardly accelerated movement of the support members is to bring the striking plate 230 into engagement with the roller 116 quickly thus further insuring that the adhesive applicator 148 will not prematurely engage the insole bottom. The compounded downward and rearward movement of the cement applicator 148 thus continues until the striker plate 230 of the bracket 150 engages the roller 116 that is mounted to the heel clamp pad 108 as shown in FIGURE 19 whereupon continued downward movement of the cement applicator 148 in response to continued actuation of the motor 130 may bring the cement applicator into engagement with the bottom of the insole I as shown in FRIGURE 20. It should be noted that as the motor 130 is continually actuated to move the cement applicator 148 downwardly into engagement with the insole bottom the second link 216 and the roller 222 mounted thereto continue to pivot rearwardly and away from its associated support member 144 so that when the adhesive applicator has been brought into complete engagement with said insole bottom (as shown in FIGURE 20) the second link 216 is in a disposition such that the roller 222 is located in a position that is remote from its associated support member 144. As mentioned earlier, after the adhesive applicator has been effective to deposit a bead B of cement onto the insole bottom the motor 130 is actuated so as to cause the lever 136 to pivot in a clockwise direction as seen in the illustrations. This pivotal movement of the lever 136 causes the support members 144 and adhesive applicator 148 to immediately move upwardly therewith. When the adhesive applicator was in flush engagement with the insole bottom, the pin 210 secured to the rearward most end of the lever 136 was in abutment with the rearward most end of the slot 214 formed in the first link 212 (see FIGURE 20). Thus, as the lever 136 begins its clockwise pivotal movement the support members 144 mounted thereto will immediately begin to move upwardly from the shoe assembly whereas the first and second links 212 and 216 and therefore the rollers 222 will remain motionless until the pin 210 has moved to the forwardmost end of the slot 214 formed in the first link 212 (as shown in FIGURE 2). The effect of beginning the withdrawal of the cement applicator 148 while maintaining the rollers 222 motionless and in an out-of-the-way position is to insure that the rollers 222 will remain disengaged from the cam track 228 formed on the rearward edge 226 of the support member 144 and thus preclude the relatively steeply inclined cam track 228 from binding on the roller 222. When the lever 136 has been pivoted an amount such that the pin 210 engages the forwardmost end of the slot 214 formed in the first link 212, the second link 216 will be pivoted forward thus bringing the roller 222 toward its associated supported member 144. When the rollers 222 have been pivoted into engagement with their associated support members 144 the apparatus will be in the position shown in FIGURE 22 wherefrom it may be seen that the striker plate 230 is still in engagement with the roller 116. It may thus be seen that until the roller 222 engages the support member 144 the path of movement of the adhesive applicator 148, when being raised from the shoe assembly is governed by the striking plate 230 and roller 116 and is thus substantially vertical. The path of movement of the adhesive applicator 148 when being returned to its idle, out-of-the-way position is shown by the dotted line 151 in FIGURE 18.

After the bead B of adhesive has been deposited on the insole I and the adhesive applicator 148 has been retracted upwardly therefrom the control circuit of the machine causes the wiping mechanism to be actuated to cause the upper margin M to be folded over and pressed against the insole I. The configuration of the lower trough 176 substantially parallels the periphery of the heel end of the insole so that the bead B of adhesive deposited thereby will lie in the region of the insole onto which the upper margin M is subsequently folded and pressed by the wipers 118 so that the upper margin M may become bonded to the insole I.

The remainder of the cycle of operation of the machine is identical to that of the machine disclosed in the aforementioned application Ser. No. 478,185 filed Aug. 9, 1965. During the operation of the wiping mechanism the control circuit causes the pincers 36 to release their grip on the shoe upper U. Towards the end of the wiping stroke when the wipers 118 have folded the upper margin M against the insole I the upper margin M then being pressed between the bottom surface of the wipers 118 and the insole I the controlled surface of the machine causes the motor 90 to be activated to effect a rearward pivoting of the hold-down block 72 thereby raising the hold-down foot 50 from the shoe assembly so that the entire resistance to upward movement of the shoe assembly in response to the continuous upward force of the motor 16 is resisted by the bottom surface of the wipers 118. The upwardly directed force of the motor 16 is then increased in response to a signal from the control circuit to cause the upper margin M to be more firmly pressed between the insole I and the bottom surface of the wipers 118 to insure that the bond between the upper margin M and the insole I will be permanent. The duration of time for which this increased upward force or "bedding pressure" is applied is dependent on the bonding characteristics of the adhesive and the materials used in the shoe assembly. It should be noted that when the motor 90 is actuated to cause the holddown foot 50 to be raised, the entire adhesive applicator mechanism which is mounted on the hold down block 72 will pivot rearwardly in unison therewith. This, however, is of no consequence because the adhesive applicator mechanism has already performed its function and has been previously retracted to a non-working, out-of-the-way position.

When the aforementioned bedding pressure has been maintained for a sufficient time the various components of the machine are caused, by means of the control circuit, to be returned to their idle, non-working positions and the heel seat lasted shoe assembly may be removed from the machine.

Summarizing the operation of the machine, the shoe assembly initially presented to the machine with the heel portion thereof supported on the pedestal 30 and the toe portion thereof supported in the toe supporting and shoe upper stretching mechanism 34 with the toe portion of the upper U inserted between the open jaws of the pincers 36. The pincers 36 are then activated to grip the upper U. The shoe upper stretching mechanism 34 is then activated to move the pincers 36 horizontally in a forward direction to thereby stretch the upper U about the last L, the last being maintained in its original position by means of engagement of the last pin 32 and the last pin hole H of the last L. The control circuit is so constructed as to permit the operator to interrupt the operation of the machine and inspect the shoe assembly after the pincers 36 have gripped the upper U and also to inspect it after the upper stretching mechanism 34 has effected the horizontal stretching of the upper U so that if either of these operations have not been satisfactorily performed the machine may be returned to its original idle position and the cycle started over again. When the operator is satisfied with the gripping and horizontal stretching of the upper, he may then resume operation of the machine. In resuming operation, the control circuit causes the motor 66 to be actuated to move the hold down slide 52 and the hold down mechanism 48 mounted thereon to the forward working position such that the hold down foot 50 is positioned directly above the pedestal 30 and the heel of the insole I. After the hold down mechanism 48 has been moved to its forward working position the control circuit causes the motor 16 to be actuated to thereby raise the toe post 20 and the shoe assembly supported thereby until the heel portion of the insole bottom is brought into abutment with the bottom of the hold down foot 50, the elevation of the hold down foot 50 having been previously adjusted so that the insole I may be brought to the proper elevation with respect to the wipers 118. As the toe post 20 rises, the control circuit causes activation of the motor 46 to move the main slide plate 42 and thus the heel clamping and wiping mechanisms which are supported thereby to a forward working position, the control circuit being operative to insure that the toe post 20 has been raised to bring the insole I into abutment with the hold down foot 50 before the bight of the heel clamp pad abuts the heel end of the shoe assembly. When the bight 109 of the heel clamp pad 108 does abut the heel end of the shoe assembly the control circuit causes activation of the heel clamp mechanism to swing the legs 110 of the heel clamp pad 108 inwardly towards the shoe assembly thereby pressing the upper U more firmly to the heel portion of the last L.

After the shoe assembly has been brought into abutment with the hold down foot 50 but before the heel clamp mechanism is actuated to swing the legs 110 of the heel clamp pad 108 inwardly toward the shoe assembly, the control circuit causes the upper stretching mechanism 34 to effect a vertical raising of the pincers 36 to thereby stretch the upper U vertically about the last.

Thus at this point of time in the cycle of operation of the machine the shoe assembly is rigidly supported with the upper U being in a stretched condition about the last L and being firmly pressed to the heel end of the last L by the heel clamp pad 108. When the shoe assembly is in this condition it is in readiness to receive the bead B of adhesive. The control circuit is effective after the heel clamp 108 has pressed the upper to the last L to actuate the motor 130 thereby imparting substantially downward movement to the support members 144 and the adhesive applicator 148 mounted thereto while at the same time causing the rollers 222 to be pivoted upwardly and rearwardly of the support members 144, the tension spring 224 being continually effective to maintain the rearward most surface 226 of the support members 144 in engagement with the rollers 222 so as to produce the initially downward movement and subsequently combined downward and rearwardly accelerated movement of the support members and cement applicator 148. This motion of the support members 144 continues until the striking plate 230 of the bracket 150 engages the roller 116 mounted to the bight 109 of the heel clamp pad 108 whereupon the rearward movement of the support members 144 is terminated and the guiding of the support members 144 and adhesive applicator 148 downwardly towards the bottom of the insole I is effected solely by the cooperation of the striking plate 230 and the roller 116. When the striking plate 230 engages the roller 116 the continued rearward pivoting of the second link 216 causes the rollers 222 to become disengaged from the rearward surface of the support member 144 with the second link pivoting to its aforesaid remote disposition.

When the adhesive applicator 148 has become seated in flush abutment with the bottom of the insole I the control circuit causes adhesive to be forced from a source thereof into the hollow extension 166 of the upper support plate 162 and finally into the trough 176 whereupon the adhesive may fill the trough 176 and adhere to the insole I in a pattern determined by the configuration of the trough 176 and the lateral spacing of the lower applicator plates 164. As mentioned earlier the source of adhesive may be any suitable one, an example of such a source being disclosed in U.S. Patent No. 3,397,417.

After the bead B of adhesive has been deposited on the insole I the control circuit causes activation of the motor 130 to raise the support members 144 and the adhesive applicator 148 to their idle position while simultaneously delaying the return of the rollers 222 to their idle binding on the steeply inclined cam tracks 226 of the support members. The control circuit then causes the wiping mechanism to be actuated so that the wipers 118 move towards the shoe assembly and engage the upper margin M to fold the upper margin against the insole I with the bead B of adhesive being sandwiched therebetween. During the latter part of the stroke of the wipers 118 the control circuit causes the pincers 36 to release their grip on the upper U for reasons more fully disclosed in the U.S. Patent No. 3,386,115.

At or near the end of the wiper stroke the control circuit causes the motor 90 to become activated thereby effecting a releasing of the hold down foot 50 from the insole bottom thus transferring the upwardly directed force of the motor 16 from the hold down 50 to the bottom surface of the wipers 118. At approximately the same time as the hold down foot 50 is raised air is introduced under increased pressure into the motor 16 to cause the upper margin M to be pressed between the insole I and the bottom surface of the wipers 118 to effect a more permanent bond between the insole I and upper margin M. When this increased bedding pressure has been applied for a sufficient length of time the control circuit causes all the mechanisms that have not yet done so, to return to their idle position in readiness for another complete cycle.

We claim:

1. In a shoe machine having means for supporting a shoe assembly in a bottom-up position, said shoe assembly including an insole having an upper abuttingly draped about a selected portion thereof in such orientation that a selected marginal portion of said upper extends upwardly of and beyond the bottom of said insole so as to form an angulate portion between said upper and said insole, an apparatus for applying adhesive in a predetermined pattern to said angulate portion of said shoe assembly comprising:

an adhesive applicator having an inlet and an outlet, said outlet being so constructed and arranged as to be capable of distributing said adhesive in said predetermined pattern at said angulate portion of said shoe assembly;

applicator support means mounting said adhesive applicator to said machine for movement between a first position wherein said adhesive applicator is located above and remote from said angulate portion of said shoe assembly and a second position wherein said adhesive applicator is in engagement with said angulate portion of said shoe assembly and in readiness to distribute said adhesive thereto;

a stop member;

means mounting said stop member to said machine, said mounting means being moveable towards and away from, so as to be abuttingly engageable with, said selected portion of said shoe assembly, said stop member being moveable in unison therewith such that when said mounting means is in engagement with said shoe assembly, said stop member may be spaced a predetermined, fixed distance from said selected portion of said shoe assembly irrespective of the size or shape of said shoe assembly, said stop member and said mounting means therefor being arranged such that when said mounting means is in engagement with said selected portion of said shoe assembly, said stop member may be disposed along the path of movement of said applicator support means such that said applicator support means may abuttingly engage said stop member at a position intermediate said first and said second position; and means responsive to engagement of said applicator support means with said stop member to effect a change in the path of movement of said applicator support means such that said applicator support means may move said adhesive applicator from said intermediate position directly to said second position whereby said adhesive applicator may be in engagement with said angulate portion of said shoe assembly so as to be in readiness to distribute adhesive thereto.

2. An apparatus as recited in claim 1 wherein said charged path movement of said applicator support means from said intermediate position up to said second position is more nearly vertical than the path of movement thereof immediately preceding engagement of said applicator support means and said stop member.

3. In a shoe machine having means for supporting a shoe assembly in a bottom-up position, said shoe assembly including an insole having an upper abuttingly draped about a selected portion thereof in such orientation that a selected marginal portion of said upper extends upwardly of and beyond the bottom of said insole, and a shoe manufacturing instrumentality adapted to abuttingly engage said end of said shoe assembly, an apparatus for applying adhesive in a predetermined pattern to said angulate portion of said shoe assembly comprising:

an adhesive applicator having an inlet and an outlet, said outlet being so constructed and arranged as to be capable of distributing said adhesive in said predetermined pattern at said angulate portion of said shoe assembly;

applicator support means movably mounted to said machine, said adhesive applicator being mounted to said applicator support means for movement therewith;

a stop member mounted to said shoe manufacturing instrumentality for movement therewith such that when said shoe manufacturing instrumentality is in abutting engagement with said selected portion of said shoe assembly, said stop member may be spaced a predetermined, fixed distance from said selected portion of said shoe assembly;

guide means operatively associated with said support member and being so constructed and arranged as to guide said support member towards and into engagement with said stop member; and means responsive to engagement of said support member with said stop member to effect movement of said support member so as to carry said adhesive applicator into engagement with said angulate portion of said shoe assembly.

4. An apparatus as recited in claim 3 wherein said shoe manufacturing instrumentality comprises a shoe end clamping member.

5. An apparatus as recited in claim 3 further comprising:

means for effecting dis-engagement of said guide means of said support member upon engagement of said support member with said stop member whereby said movement of said adhesive applicator towards and into engagement with said angulate portion of said shoe assembly may be effected independently of said guide means.

6. An apparatus as recited in claim 5 wherein said shoe manufacturing instrumentality comprises a shoe end clamping member.

7. In a shoe machine having means for supporting a shoe assembly in a bottom-up position, said shoe assembly including an insole having an upper abuttingly draped about a selected portion thereof in such orientation that a selected marginal portion of said upper extends upwardly of and beyond the bottom of said insole so as to form an angulate portion between said upper and said insole, an apparatus for applying adhesive in a predetermined pattern to said angulate portion of said shoe assembly comprising:

an adhesive applicator having an inlet and an outlet said outlet being so constructed and arranged as to be capable of distributing said adhesive in said predetermined pattern at said angulate portion of said shoe assembly;

applicator support means spaced above said insole and being mounted to said machine for movement in a heightwise extending plane between a first position wherein said adhesive applicator is located above and remote from said angulate portion of said shoe assembly and a second position wherein said adhesive applicator is in engagement with said angulate portion of said shoe assembly and in readiness to distribute said adhesive thereto, said applicator support means having a cam track formed thereon and a portion thereof extending downwardly towards said insole, said adhesive applicator being mounted to said downwardly extending portion of said applicator support means for movement therewith;

a stop member;

means mounting said stop member to said machine, said mounting means being movable towards and away from, so as to be abuttingly engageable with, said selected portion of said shoe assembly, said stop member being movable in unison therewith such that when said mounting means is in engagement with said shoe assembly, said stop member may be spaced a predetermined, fixed distance from said selected portion of said shoe assembly irrespective of the size or shape of said shoe assembly, said stop member and said mounting means therefor being arranged such that when said mounting means is in engagement with said selected portion of said shoe assembly, said stop member may be disposed along the path of movement of said applicator support means such that said applicator support means may abuttingly engage said stop member at a position intermediate said first and said second positions;

an abutting member mounted to said machine and being located in said heightwise extending plane of movement of said applicator support means so as to be engageable with said cam track formed on said applicator support means;

means mounting said abutting member to said machine for movement that is towards and into engagement with said cam track and away and out of engagement with said cam track;

means biasing said applicator support means towards said abutting member such that said cam track may be in engagement with said abutting member; and means responsive to engagement of said applicator support means with said stop member during said movement of said applicator support means toward said shoe assembly to simultaneously effect a change in the path of movement of said applicator support means such that said applicator support means may move said adhesive applicator from said intermediate position directly to said second position whereby said applicator may be in engagement with said angulate portion of said shoe assembly so as to be in readiness to distribute adhesive thereto and effect movement of said abutting member away from and out of engagement with said cam track.

8. An apparatus recited in claim 7 further comprising means maintaining said abutting member away from and out of engagement with said cam track until movement of said applicator support means and adhesive applicator mounted thereto upwardly and away from said shoe assembly has been initiated.

9. A shoe machine comprising:

means for supporting a shoe assembly in a bottom-up position, said shoe assembly including an insole having an upper abuttingly draped about one end thereof in such orientation that a selected marginal portion of said upper extends upwardly of and beyond the bottom of said insole so as to form an angulate portion between said upper and said insole;

a shoe operating instrumentality mounted to said machine for movement towards and away from said end of said shoe assembly, said shoe operating instrumentality being engageable therewith when moved towards said end of said shoe assembly;

wiping means moveably mounted to said machine above said shoe operating instrumentality, said wiping means being so constructed and arranged as to be effective to wipe said selected marginal portion of said upper to the bottom of said insole;

a stop member mounted to said shoe operating instrumentality and extending upwardly thereof and beyond the level of said wiping means, said stop member being moveable in unison with said shoe operating instrumentality such that when said shoe operating instrumentality is in engagement with end of said shoe assembly said stop member may be spaced a predetermined, fixed distance from said selected portion of said shoe assembly irrespective of the size or shape of said shoe assembly;

an adhesive applicator having an inlet and an outlet, said outlet being so constructed and arranged as to be capable of distributing said adhesive in a predetermined pattern at said angulate portion of said shoe assembly;

applicator support means mounting said adhesive applicator to said machine for movement between a first position wherein said adhesive applicator is located above and remote from said angulate portion of said shoe assembly and a second position wherein said adhesive applicator is in engagement with said angulate portion of said shoe assembly and in readiness to distribute said adhesive thereto, said stop member and shoe operating instrumentality being so constructed that when said shoe operating instrumentality is in engagement with said end of said shoe assembly said stop member may be disposed along the path of movement of said applicator support means such that said applicator support means may abuttingly engage said stop member at a position intermediate said first and said second position; and means responsive to engagement of said applicator support means with said stop member to effect a change in the path of movement of said applicator support means such that said applicator support means may move said adhesive applicator from said intermediate position directly to said second position whereby said adhesive applicator may be in engagement with said angulate portion of said shoe assembly so as to be in readiness to distribute adhesive thereto.

10. An apparatus as recited in claim 7 wherein said shoe operating instrumentality comprises a shoe end clamping member.

11. An apparatus as recited in claim 9 wherein said changed path of movement of said applicator support means and said applicator from said intermediate position to said second position is more nearly vertical than the path of movement thereof immediately preceding engagement of said applicator support means with said stop member.

12. An apparatus as recited in claim 8 wherein said shoe operating instrumentality comprises a shoe end clamping member.

13. An apparatus as recited in claim 9 wherein said shoe operating instrumentality comprises a shoe end clamping member; and wherein said wiping means comprises:

a pair of wipers, each of said wipers have a rearward edge facing and adjacent the corresponding rearward edge of the other of said wipers, each of said adjacent rearward edges of said wipers having a recessed portion formed therein, said recessed portions being so formed as to cooperatively define a cut-out in said wipers of such dimensions as to permit said stop member to extend upwardly through said cut-out, said stop member extending upwardly therethrough.

14. An apparatus as recited in claim 9 wherein said shoe operating instrumentality comprises a shoe end clamping member; and wherein said wiping means comprises:
    a pair of wipers, each of said wipers having a rearward edge spaced from and facing the corresponding rearward edge of the other of said wipers, said stop member extending upwardly through and between said spaced rearward edges of said wipers.

15. An apparatus as recited in claim 9 wherein said shoe operating instrumentality comprises a shoe end clamping member and wherein said wiping means comprises:
    a pair of wipers having adjacent but spaced rearward portions so as to define an opening therebetween, said opening being adapted to receive said stop member, said stop member extending upwardly therethrough.

16. A shoe machine comprising:
    means for supporting a shoe assembly in a bottom-up position, said shoe assembly including an insole having an upper abuttingly draped about one end thereof in such orientation that a selected marginal portion of said upper extends upwardly of and beyond the bottom of said insole so as to form an angulate portion between said upper and said insole;
    a shoe end clamping member mounted to said machine for movement towards and away from said end of said shoe assembly, said shoe end clamping member being engageable therewith when moved towards said end of said shoe assembly;
    a pair of wipers having rearwardly adjacent and forwardly diverging edges, said wipers being moveably mounted to said machine above said end clamping member, at least one of said wipers having a cut-out portion formed at the rearward adjacent edge thereof, said wipers being so constructed and arranged as to be effective to wipe said selected marginal portion of said upper to the bottom of said insole;
    drive means operatively connected to said wipers to effect said movement thereof;
    a stop member mounted to said end clamping member and extending upwardly thereof through said cut-out portion of said wiper, said stop member being moveable in unison with said end clamping member such that when said end clamping member is in engagement with said end of said shoe assembly, said stop member may be spaced a predetermined, fixed distance from said end of said shoe assembly irrespectively of the size or shape of said shoe assembly;
    an adhesive applicator having an inlet and an outlet, said outlet being so constructed and arranged as to be capable of distributing said adhesive in a predetermined pattern at said angulate portion of said shoe assembly;
    applicator support means mounting said adhesive applicator to said machine for movement between a first position wherein said adhesive applicator is located above and remote from said angulate portion of said shoe assembly and a second position wherein said adhesive applicator is in engagement with said angulate portion of said shoe assembly and in readiness to distribute said adhesive thereto, said stop member and said end clamping member being so constructed that when said end clamping member is in engagement with said end of said shoe assembly said stop member may be disposed along the path of movement of said applicator support means such that said applicator support means may abuttingly engage said stop member at a position intermediate said first and said second positions; and
    means responsive to engagement of said applicator support means with said stop member to effect a change in the path of movement of said applicator support means such that said applicator support means may move said adhesive applicator from said intermediate position directly to said second position whereby said adhesive applicator may be in engagement with said angulate portion of said shoe assembly so as to be in readiness to distribute adhesive thereto.

17. A shoe machine comprising:
    means for supporting a shoe assembly in a bottom-up position, said shoe assembly including an insole having an upper abuttingly draped about one end thereof in such orientation that a selected marginal portion of said upper extends upwardly of and beyond the bottom of said insole so as to form an angulate portion between said upper and said insole;
    an end clamping member mounted to said machine for movement towards and away from said end of said shoe assembly, said end clamping member being engageable with, when moved towards, said end of said shoe assembly;
    a pair of wipers having forward edges that diverge forwardly from a vertex and rearward adjacent edges that extend rearwardly of said vertex, each of said rearward adjacent edges of said wipers having a recessed portion formed therein such that said recessed portions may cooperatively define a cut-out at the rearward end of said wipers;
    drive means operatively connected to said wipers for effecting swinging movement of said wipers about said vertex so as to cause said forwardly diverging edges to swing towards each other in a wiping stroke while causing said adjacent rearward edges of said wipers to swing away from each other;
    a stop member secured to said shoe end clamping member and extending upwardly therefrom through said cut-out to a level above that of said wipers, said stop member being moveable in unison with said shoe end clamping member such that when said shoe end clamping member is in engagement with said end of said shoe assembly, said stop member may be spaced a predetermined, fixed distance from said selected portion of said shoe assembly irrespective of the size or shape of said shoe assembly, said stop member having at least one wing member extending laterally therefrom and being located above level of said wipers, said wing being abuttingly and slidably engageable with the upper surface of at least one of said wipers, said wing extending laterally an amount sufficient to insure that upon actuation of said drive means to effect swinging movement of said wipers thus separating said adjacent rearward edges thereof, at least a portion of said wing may be in engagement with the upper surface of at least one of said wipers;
    an adhesive applicator having an inlet and an outlet, said outlet being so constructed and arranged as to be capable of distributing said adhesive in a predetermined pattern at said angulate portion of said shoe assembly;
    applicator support means mounting said adhesive applicator to said machine for movement between a first position wherein said adhesive applicator is located above and remote from said angulate portion of said shoe assembly and a second position wherein said adhesive applicator is in engagement with said angulate portion of said shoe assembly and in readiness to distribute said adhesive thereto, said stop member and shoe end clamping member being so constructed that when said shoe end clamping member is in engagement with said end of said shoe assembly said stop member may be disposed along the path of movement of said applicator support means such that said applicator support means may abuttingly engage said stop member at a position intermediate said first and said second positions; and
    means responsive to engagement of said applicator support means with said stop member to effect a change in the path of movement of said applicator support means such that said applicator support means may move said adhesive applicator from said intermediate position directly to said second position whereby said adhesive applicator may be in engagement with said angulate portion of said shoe assembly so as to be in readiness to distribute adhesive thereto.

18. A shoe machine comprising:

means for supporting a shoe assembly in a bottom-up position, said shoe assembly including an insole having an upper abuttingly draped about one end thereof in such orientation that a selected marginal portion of said upper extends upwardly of and beyond the bottom of said insole so as to form an angulate portion between said upper and said insole;

an end clamping member mounted to said machine for movement towards and away from said end of said shoe assembly, said end clamping member being engageable with, when moved towards, said end of said shoe assembly;

a pair of wipers, each of said wipers having a forward edge that diverges forwardly from a vertex and a rearward edge spaced from and facing the corresponding rearward edge of the other said wipers;

drive means operatively connected to said wipers for effecting swinging movement of said wipers about said vertex so as to cause said forwardly diverging edges to swing towards each other in a wiping stroke while causing said spaced rearward edges of said wipers to swing away from each other;

a stop member secured to said shoe end clamping member and extending upwardly therefrom through and between said spaced rearward edges of said wipers to a level above that of said wipers, said stop member being moveable in unison with said shoe end clamping member such that when said shoe end clamping member is in engagement with said end of said shoe assembly, said stop member may be spaced a predetermined, fixed distance from said selected portion of said shoe assembly irrespective of the size or shape of said shoe assembly, said stop member having at least one wing member extending laterally therefrom and being located above the level of said wipers, said wing being abuttingly and slidably engageable with the upper surface of at least one of said wipers, said wing extending laterally an amount sufficient to insure that upon actuation of said drive means to effect swinging movement of said wipers thus further separating said spaced rearward edges thereof, at least a portion of said wing may remain in engagement with the upper surface of at least wipers;

an adhesive applicator having an inlet and an outlet, said outlet being so constructed and arranged as to be capable of distributing said adhesive in a predetermined pattern of said angulate portion of said shoe assembly;

applicator support means mounting said adhesive applicator to said machine for movement between a first position wherein said adhesive applicator is located above and remote from said angulate portion of said shoe assembly and a second position wherein said adhesive applicator is in engagement with said angulate portion of said shoe assembly and in readiness to distribute said adhesive thereto, said stop member and shoe end clamping member being so constructed that when said shoe end clamping member is in engagement with said end of said shoe assembly, said stop member may be disposed along the path of movement of said applicator support means such that said applicator support means may abuttingly engage said stop member at a position intermediate said first and said second positions; and means responsive to engagement of said applicator support means with said stop member to effect a change in the path of movement of said applicator support means such that said applicator support means may move said adhesive applicator from said intermediate position directly to said second position whereby said adhesive applicator may be in engagement with said angulate portion of said shoe assembly so as to be in readiness to distribute adhesive thereto.

19. In a shoe machine having means for supporting a shoe assembly in a bottom-up position, said shoe assembly including an insole having a shoe upper abuttingly draped about a selected portion thereof in such orientation that a selected marginal portion of said upper extends upwardly of and beyond the bottom of said insole so as to form an angulate portion between said upper and said insole, an apparatus for applying adhesive in a predetermined pattern to said angulate portion of said shoe assembly comprising:

a forwardly-rearwardly extending lever, pivotally mounted at a point intermediate its ends to said machine for pivotal movement in a heightwise extending plane and being located upwardly of said shoe assembly supporting means;

drive means mounted to said machine and being operatively connected to said lever to effect said pivotal movement thereof;

at least one support member pivotally connected to and depending from the forwardly extending end of said lever, said support member having a cam track formed thereon;

an adhesive applicator having an inlet and an outlet, said outlet being so constructed and arranged as to be capable of distributing said adhesive in said predetermined pattern at said angulate portion of said shoe assembly, said adhesive applicator being mounted to and depending from said support member for movement therewith;

a drive link connected at one end thereof to the rearwardly extending end of said lever, the other end of said drive link extending in a downward and forward direction;

a driven link located below said lever and being pivotally mounted at one end thereof to said machine and having the free other end thereof extending towards said support member, said free end of said driven link being pivotally connected to said downwardly-forwardly extending end of said drive link;

an abutting member mounted to said free end of said driven link and being so disposed as to be in aligned relationship with said cam track such that upon actuation of said drive means to pivot said lever to move said support member downwardly, said rearward end of said lever may simultaneously pivot upwardly to raise said drive link therewith thus causing said driven link and said abutting member mounted thereto to have a component of motion that is directed away from said cam track;

means biasing said support member toward said abutting member so as to maintain said cam track and abutting member in engagement;

a stop member;

means mounting said stop member to said machine, said mounting means being moveable towards and away from, so as to be abuttingly engageable with said selected portion of said shoe assembly, said stop member being moveable in unison therewith such that when said mounting means is in engagement with said shoe assembly, said stop member may be spaced a predetermined, fixed distance from said selected portion of said shoe assembly, said cam track being of such configuration as to cause said support member to move in a path that is intersected by said stop number whereby said support member may abut said stop member to thus arrest rearward movement yet permitting downward movement of said support member whereupon continued actuation of said drive means may simultaneously cause said support member to carry said adhesive applicator downwardly toward and into engagement with said angulate portion of said shoe assembly and cause said abutting member to continue to pivot rearwardly and away from said support member so as to become disengaged from said cam track, said movement of said lever, support member, and drive and driven links terminating upon engagement of said adhesive applicator with said shoe assembly; and means connecting said rearwardly extending end of said lever to said upper end of said drive link for lost-motion therebetween, said lost-motion connection being arranged such that upon actuation of said drive means to simultaneously raise said support member and pivot said rearwardly extending end of said lever downwardly said drive link may remain temporarily motionless, thus maintaining said abutting member out of engagement with said cam track during the early portion of the raising of said adhesive applicator from said shoe assembly whereby interference between said cam track and said abutting member may be precluded during said raising of said adhesive applicator.

20. An apparatus as recited in claim 15 wherein said lost-motion connection between said lever and said first link comprises:

a slot formed in said upper end of said link, said slot having its longitudinal dimension disposed lengthwise of said first link; and a pin secured to said rearwardly extending end of said lever, said pin extending into said slot for slidable movement therein.

21. In a shoe machine having means for supporting a shoe assembly in a bottom-up position, said shoe assembly including an insole having a shoe upper abuttingly draped about a selected portion thereof in such orientation that a selected marginal portion of said upper extends upwardly of and beyond the bottom of said insole so as to form an angulate portion between said upper and said insole, an apparatus for applying adhesive in a predetermined pattern to said angulate portion of said shoe assembly comprising:

an adhesive applicator having an inlet and an outlet, said outlet being so constructed and arranged as to be capable of distributing said adhesive in said predetermined pattern at said angulate portion of said shoe assembly;

a support member spaced above said shoe assembly supporting means and being located forwardly of said angulate portion of said shoe assembly, said support member being mounted to said machine for movement in a heightwise extending plane in a direction having components that are directed towards and away from said insole and in a forward-rearward direction that is towards and away from said angulate portion of said shoe assembly said support member having a downwardly and rearwardly sloping cam track formed at the rearward surface thereof, said adhesive applicator being mounted to the lower portion of said support member;

drive means operatively engaged with said support member to effect said motion thereof;

an abutting member mounted to said machine and being located rearwardly of said support member, said abutting member being disposed in said heightwise extending plane of movement of said support member;

a stop member;

means mounting said stop member to said machine rearwardly of said support member, said mounting means being moveable towards and away from, so as to be abuttingly engageable with said selected portion of said shoe assembly, said stop member being moveable in unison therewith such that when said mounting means is in engagement with said shoe assembly, said stop member may be spaced a predetermined, fixed distance from said selected portion of said shoe assembly;

bias means operatively associated with said support member and being so constructed and arranged as to continuously urge said support member rearwardly towards said abutting member and said stop member so as to cause said cam track to be in abutting engagement with said abutting member such that upon actuation of said drive means to move said support member downwardly, said cam track and said abutting member may be effective to simultaneously guide said support member in a rearward direction, said stop member being located along the path of movement of said support member whereby said support member may abut said stop member to thus arrest rearward movement, yet permitting downward movement, of said support member whereupon continued actuation of said drive means may cause said support member to carry said adhesive applicator downwardly toward and into engagement with said angulate portion of said shoe assembly;

means mounting said abutting member to said machine for movement that is towards and away from said cam track whereby during said downward movement of said adhesive applicator said abutting member may be moved rearwardly away from said cam track thereby accelerating the movement of said support member rearwardly into engagement with said stop member;

means continuing said movement of said abutting member away from said cam track subsequent to engagement of said support member with said stop member; and means maintaining said abutting member out of engagement with said cam track until after said drive means has initiated upward movement of said support member from said shoe assembly thereby precluding mechanical interference between said abutting member and said relatively steeply inclined cam track.

22. In a shoe machine having means for supporting a shoe assembly in a bottom-up position, said shoe assembly including an insole having a shoe upper abuttingly draped about a selected portion thereof in such orientation that a selected marginal portion of said upper extends upwardly of and beyond the bottom of said insole so as to form an angulate portion between said upper and said insole, an apparatus for applying adhesive in a predetermined pattern to said angulate portion of said shoe assembly comprising:

a lever, pivotally mounted to said machine for pivotal movement in a heightwise extending plane and being located upwardly of said shoe assembly supporting means;

first drive means mounted to said machine and being operatively connected to said lever to effect said pivotal movement thereof;

at least one support member pivotally connected to and depending from said lever, said support member having a cam track formed thereon;

an adhesive applicator having an inlet and an outlet, said outlet being so constructed and arranged as to be capable of distributing said adhesive in said predetermined pattern at said angulate portion of said shoe assembly, said adhesive applicator being mounted to and depending from said support member for movement therewith;

a driven link located below said lever and being pivotally mounted at one end thereof to said machine, said driven link having the free, other end thereof extending towards said support member;

an abutting member mounted to said free end of said driven link and being so disposed as to be in aligned relationship with said cam track;

means biasing said support member towards said abutting member so as to maintain said cam track and abutting member in engagement;

second drive means operatively connected to said driven link for effecting pivotal movement thereof such that said abutting member may move in a path having upwardly and rearwardly directed components so as to move said abutting member in a direction that is rearwardly away from said cam track;

a stop member;

means mounting said stop member to said machine, said mounting means being moveable towards and away from, so as to be abuttingly engageable with said selected portion of said shoe assembly, said stop member being moveable in unison therewith such that when said mounting means is in engagement with said shoe assembly, said stop member may be spaced a predetermined, fixed distance from said selected portion of said shoe assembly, said cam track being of such configuration as to cause said support member to move in a path that is intersected by said stop member when said mounting means is in engagement with said shoe assembly whereby said support member may abut said stop member to thus arrest rearward movement, yet permitting downward movement, of said support member whereupon continued actuation of said drive means may simultaneously cause said support member to carry said adhesive applicator downwardly toward and into engagement with said angulate portion of said shoe assembly; and means for continuing said movement of said abutting member away from said cam track subsequent to engagement of said support member with said stop member so as to become disengaged from said cam track.

23. An apparatus as recited in claim 22 further comprising means maintaining said abutting member out of engagement with said cam track until after said first drive means has been effective to initiate the raising of said support member and adhesive applicator from said shoe assembly.

24. An apparatus as recited in claim 22 wherein said lever extends in a forward-rearward direction and is pivotally mounted to said machine at a point intermediate its ends, said support member being mounted to and depending from the forwardly extending end of said lever; and wherein said second drive means and said means for continuing said movement of said abutting member away from said cam track subsequent to engagement of said support member with said stop member comprises:

drive link connected at one end thereof to the rearwardly extending end of said lever, the other end of said drive link extending downwardly and forwardly and being pivotally connected to said free end of said driven link.

25. In a shoe machine having means for supporting a shoe assembly in a bottom-up position, said shoe assembly including an insole having an upper abuttingly draped about a selected portion thereof in such orientation that a selected marginal portion of said upper extends upwardly of and beyond the bottom of said insole so as to form an angulate portion between said upper and said insole, an apparatus for applying adhesive in a predetermined pattern to said angulate portion of said shoe assembly comprising:

an adhesive applicator assembly, said adhesive applicator assembly including an adhesive applicator having an inlet and an outlet, said outlet being so constructed and arranged as to be capable of distributing said adhesive in said predetermined pattern at said angulate portion of said assembly and an applicator support means mounting said adhesive applicator to said machine for movement between a first position wherein said applicator is located above and remote from said angulate portion of said shoe assembly and a second position wherein said adhesive applicator is in engagement with said angulate portion of said shoe assembly and in readiness to distribute said adhesive thereto;

a stop member;

means mounting said stop member to said machine, said mounting means being moveable towards and away from, so as to be abuttingly engageable with, said selected portion of said shoe assembly, said stop member being moveable in unison therewith such that when said mounting means is in engagement with said shoe assembly, said stop member may be spaced a predetermined, fixed distance from said selected portion of said shoe assembly irrespective of the size or shape of the shoe assembly, said stop member and said mounting means therefor being arranged such that when said mounting means is in engagement with said selected portion of said shoe assembly, said stop member may be disposed along the path of movement of said adhesive applicator assembly such that said adhesive applicator assembly may abuttingly engage said stop member at a position intermediate said first and said second position; and means responsive to engagement of said adhesive applicator assembly with said stop member to effect a change in the path of movement of said adhesive applicator assembly such that said adhesive applicator may be moved from said intermediate position directly to said second position whereby said adhesive applicator may be in engagement with said angulate portion of said shoe assembly so as to be in readiness to distribute adhesive thereto.

References Cited

UNITED STATES PATENTS

| | | | |
|---|---|---|---|
| 2,871,818 | 2/1959 | Jorgensen | 118—600 |
| 3,035,287 | 5/1962 | Vleck et al. | 12—12.4 |
| 3,039,121 | 6/1962 | Weinschenk | 12—145 X |
| 2,228,047 | 1/1966 | Schwabe | 12—12.4 |
| 3,271,800 | 9/1966 | Allard | 12—12.5 |

PATRICK D. LAWSON, *Primary Examiner.*

PO-1050
(5/69)

UNITED STATES PATENT OFFICE
CERTIFICATE OF CORRECTION

Patent No. 3,444,571          Dated May 20, 1969

Inventor(s) Allen C. Harriman et al

It is certified that error appears in the above-identified patent and that said Letters Patent are hereby corrected as shown below:

Column 16: line 15, after "insole" insert --so as to form an angulate portion between said upper and said insole--.

Column 20: line 14, change "an" to --a shoe--; line 42, cancel "member".

Column 21: line 15, change "an" to --a shoe--; line 41, cancel "member".

SIGNED AND
SEALED
MAR 3 - 1970

(SEAL)
Attest:

Edward M. Fletcher, Jr.
Attesting Officer

WILLIAM E. SCHUYLER, JR.
Commissioner of Patents

UNITED STATES PATENT OFFICE
CERTIFICATE OF CORRECTION

Patent No. 3,444,571             Dated May 20, 1969

Inventor(s) Allen C. Harriman et al

It is certified that error appears in the above-identified patent and that said Letters Patent are hereby corrected as shown below:

Column 10: line 21, change "220" to --146--;
line 64, change "212" to --228--.
    Column 11: line 58, change "220" to --210--;
line 59, change "220" to --222--.
    Column 12: line 46, change "2" to --22--.

Signed and sealed this 8th day of June 1971.

(SEAL)
Attest:

EDWARD M. FLETCHER, JR.          WILLIAM E. SCHUYLER, JR.
Attesting Officer                   Commissioner of Patents